United States Patent
Guralp et al.

(10) Patent No.: US 12,179,605 B1
(45) Date of Patent: Dec. 31, 2024

(54) VOLTAGE SWITCHING OF AN ELECTRIC MOTOR

(71) Applicant: GM Global Technology Operations LLC, Detroit, MI (US)

(72) Inventors: Orgun A. Guralp, Northville, MI (US); Suresh Gopalakrishnan, Troy, MI (US); Chandra S. Namuduri, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/343,139

(22) Filed: Jun. 28, 2023

(51) Int. Cl.
*B60L 15/20* (2006.01)
*B60L 50/51* (2019.01)
*B60L 50/64* (2019.01)

(52) U.S. Cl.
CPC ........ *B60L 15/2045* (2013.01); *B60L 50/51* (2019.02); *B60L 50/64* (2019.02); *B60L 2240/423* (2013.01)

(58) Field of Classification Search
CPC ...... B60L 15/20; B60L 15/2045; B60L 50/64; B60L 50/51; B60L 2240/423
See application file for complete search history.

(56) References Cited

U.S. PATENT DOCUMENTS

| | | |
|---|---|---|
| 8,928,264 B2 | 1/2015 | Tangiguchi |
| 11,962,173 B2 | 4/2024 | Hao et al. |
| 2014/0210397 A1* | 7/2014 | Takenouchi ............ H02P 25/18 318/724 |

OTHER PUBLICATIONS

German Office Action for German Application No. 1020231273639; dated Jun. 24, 2024; 7 pages.

* cited by examiner

*Primary Examiner* — Robert L Deberadinis
(74) *Attorney, Agent, or Firm* — CANTOR COLBURN LLP

(57) ABSTRACT

A system for controlling a propulsion system of a vehicle includes a switching system including a first switching device connecting a battery system to a first set of windings of an electric motor, and a second switching device connecting the battery system to a second set of windings. The system also includes a controller configured to transition the propulsion system from an initial propulsion mode in which an initial voltage is applied to the electric motor, to a target mode in which a target voltage is applied. The transitioning includes controlling the first switching device to provide current to the first set of windings at the initial voltage to produce torque, and subsequently controlling the second switching device to cause the battery system to apply the target voltage to the second set of windings while the current is provided to the first set of windings at the initial voltage.

20 Claims, 6 Drawing Sheets

VOLTAGE SWITCHING OF AN ELECTRIC MOTOR

INTRODUCTION

The subject disclosure relates to vehicles, and more specifically, to controlling voltage to an electric drive of a vehicle.

Vehicles, including gasoline and diesel power vehicles, as well as electric and hybrid electric vehicles, feature battery storage for purposes such as powering electric motors, electronics and other vehicle subsystems. Some vehicles feature battery systems that can be operated to transition between different voltage levels. It is desirable to be able to operate such systems in such a manner as to reduce or minimize voltage interruptions when transitioning between voltage levels applied to an electric motor, to provide a smooth transition during vehicle operation.

SUMMARY

In one exemplary embodiment, a system for controlling a propulsion system of a vehicle includes a switching system connected to a battery system and the propulsion system, the battery system including a first battery assembly and a second battery assembly, the propulsion system including an electric motor having a first set of windings and a second set of windings, the switching system including a first switching device connecting the battery system to the first set of windings and a second switching device connecting the battery system to the second set of windings. The system also includes a controller configured to perform, during propulsion of the vehicle according to a commanded torque, transitioning the propulsion system from an initial propulsion mode in which an initial voltage is applied to the electric motor, to a target mode in which a target voltage is applied to the electric motor. The transitioning includes controlling the first switching device to provide current to the first set of windings at the initial voltage and operate the electric motor to produce torque used to propel vehicle, and subsequently controlling the second switching device to cause the battery system to apply the target voltage to the second set of windings, where the second switching device is controlled while a current is provided to the first set of windings at the initial voltage.

In addition to one or more of the features described herein, the transitioning further includes controlling the first switching device to cause the battery system to apply the target voltage to the first set of windings while the battery system is applying the target voltage to the second set of windings.

In addition to one or more of the features described herein, the first switching device and the second switching device include mechanical switches or solid state switches.

In addition to one or more of the features described herein, the first battery assembly is connected to a first inverter configured to supply alternating current (AC) to the first set of windings, and the second battery assembly is connected to a second inverter configured to supply AC current to the second set of windings.

In addition to one or more of the features described herein, the first battery assembly is selectively connected to a propulsion bus by a first switch, and the first switching device has a first switching position that connects the first inverter to a node between the first switch and the propulsion bus, and a second switching position that connects the first inverter to a node between the first switch and the first battery assembly. The second battery assembly is selectively connected to the propulsion bus by a second switch, and the second switching device has a first switching position that connects the second inverter to a node between the second switch and the propulsion bus, and a second switching position that connects the second inverter to a node between the second switch and the second battery assembly.

In addition to one or more of the features described herein, the first switching device and the second switching device are single pole double throw switches.

In addition to one or more of the features described herein, one of the initial voltage and the target voltage is a low voltage, the low voltage achieved by connecting the first battery assembly to a propulsion bus in parallel with the second battery assembly.

In addition to one or more of the features described herein, one of the initial voltage and the target voltage is a high voltage, the high voltage achieved by connecting the first battery assembly in series with the second battery assembly.

In another exemplary embodiment, a method of controlling a propulsion system of a vehicle includes receiving a request to transition the propulsion system from an initial voltage to a target voltage, the propulsion system including an electric motor having a first set of windings and a second set of windings, the electric motor connected to a battery system including a first battery assembly and a second battery assembly, the propulsion system including a switching system having a first switching device connecting the battery system to the first set of windings and a second switching device connecting the battery system to the second set of windings. The method also includes, during propulsion of the vehicle according to a commanded torque, transitioning the propulsion system from an initial propulsion mode in which the initial voltage is applied to the electric motor, to a target mode in which the target voltage is applied to the electric motor. The transitioning includes controlling the first switching device to provide current to the first set of windings at the initial voltage and operate the electric motor to produce torque used to propel vehicle, and subsequently controlling the second switching device to cause the battery system to apply the target voltage to the second set of windings, where the second switching device is controlled while a current is provided to the first set of windings at the initial voltage.

In addition to one or more of the features described herein, the transitioning further includes controlling the first switching device to cause the battery system to apply the target voltage to the first set of windings while the battery system is applying the target voltage to the second set of windings.

In addition to one or more of the features described herein, the first switching device and the second switching device include mechanical switches or solid state switches.

In addition to one or more of the features described herein, the first battery assembly is connected to a first inverter configured to supply AC current to the first set of windings, and the second battery assembly is connected to a second inverter configured to supply AC current to the second set of windings.

In addition to one or more of the features described herein, the first battery assembly is selectively connected to a propulsion bus by a first switch, and the first switching device has a first switching position that connects the first inverter to a node between the first switch and the propulsion bus, and a second switching position that connects the first inverter to a node between the first switch and the first battery assembly. The second battery assembly is selectively connected to the propulsion bus by a second switch, and the second switching device has a first switching position that connects the second inverter to a node between the second switch and the propulsion bus, and a second switching position that connects the second inverter to a node between the second switch and the second battery assembly.

In addition to one or more of the features described herein, the first switching device and the second switching device are single pole double throw switches.

In addition to one or more of the features described herein, one of the initial voltage and the target voltage is a low voltage, the low voltage achieved by connecting the first battery assembly to a propulsion bus in parallel with the second battery assembly.

In addition to one or more of the features described herein, one of the initial voltage and the target voltage is a high voltage, the high voltage achieved by connecting the first battery assembly in series with the second battery assembly.

In yet another exemplary embodiment, a vehicle system includes a memory having computer readable instructions, and a processing device for executing the computer readable instructions, the computer readable instructions controlling the processing device to perform a method. The method includes receiving a request to transition a propulsion system from an initial voltage to a target voltage, the propulsion system including an electric motor having a first set of windings and a second set of windings, the electric motor connected to a battery system including a first battery assembly and a second battery assembly, the propulsion system including a switching system having a first switching device connecting the battery system to the first set of windings and a second switching device connecting the battery system to the second set of windings. The method also includes, during propulsion of a vehicle according to a commanded torque, transitioning the propulsion system from an initial propulsion mode in which the initial voltage is applied to the electric motor, to a target mode in which the target voltage is applied to the electric motor. The transitioning includes controlling the first switching device to provide current to the first set of windings at the initial voltage and operate the electric motor to produce torque used to propel vehicle, and subsequently controlling the second switching device to cause the battery system to apply the target voltage to the second set of windings, where the second switching device is controlled while a current is provided to the first set of windings at the initial voltage.

In addition to one or more of the features described herein, the transitioning further includes controlling the first switching device to cause the battery system to apply the target voltage to the first set of windings while the battery system is applying the target voltage to the second set of windings.

In addition to one or more of the features described herein, one of the initial voltage and the target voltage is a low voltage, the low voltage achieved by connecting the first battery assembly to a propulsion bus in parallel with the second battery assembly.

In addition to one or more of the features described herein, one of the initial voltage and the target voltage is a high voltage, the high voltage achieved by connecting the first battery assembly in series with the second battery assembly.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
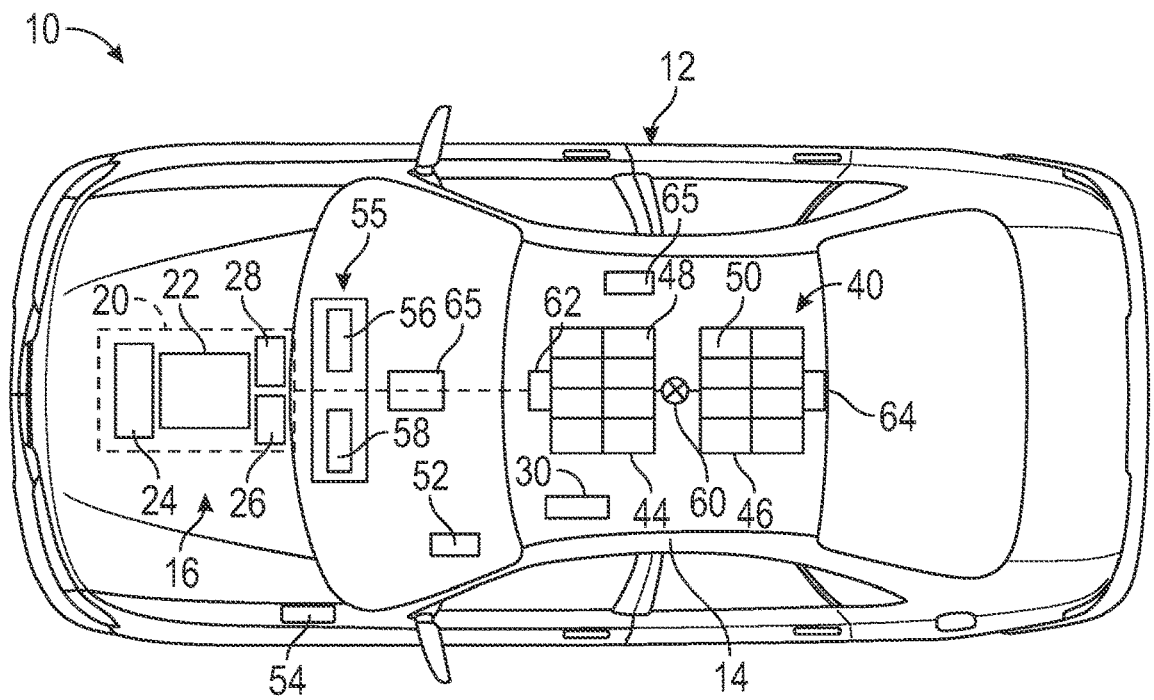
FIG. 1 is a top view of a motor vehicle including a propulsion system and a switching system for controlling voltage, in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with exemplary embodiments, methods, devices and systems are provided for controlling propulsion of a vehicle, which includes changing voltage levels applied to an electric motor during vehicle propulsion. The embodiments provide for transitioning between voltage levels used to drive the motor without interruptions in torque applied to the vehicle.

In an embodiment, the vehicle includes a propulsion system having an electric motor, and a battery system that is controllable to provide various output voltages. In an embodiment, the battery system includes a first battery assembly and a second battery assembly. For example, the first battery assembly may be a first battery pack and the second battery assembly may be a second battery pack. In another example, if the battery system includes a single battery pack (e.g., a single pack with two halves), the first and second battery assemblies may each be a part of the battery pack (e.g., one of the two halves).

In an embodiment, the electric motor is a three-phase or poly-phase dual winding motor. The dual winding motor includes a first set of windings and a second set of windings, where each phase winding in one set is connected in parallel to a corresponding phase winding in another set. The dual winding motor is controllable during vehicle propulsion to facilitate transitions between voltage levels (e.g., connecting the battery assemblies in series to provide a relatively high voltage, and connecting the battery assemblies in parallel to provide a relatively low voltage).

In an embodiment, the propulsion system includes a switching system having independently controllable switching devices that can be operated in conjunction with the dual winding motor to vary a voltage level applied to the drive unit. Embodiments also include methods for transitioning between voltage levels by sequentially operating the switching devices to change the voltage without creating interruptions in torque applied to a vehicle, to ensure smooth transitions and drivability.

Embodiments described herein present numerous advantages and technical effects. For example, existing variable voltage battery systems are not capable of changing the level of voltage applied to a single motor without some interruption in output torque, as switching between voltages involves a momentary disconnect that creates a torque hole (interruption in torque provided to the vehicle) that can impair drivability. Thus, current systems that have a single drive unit require that a vehicle be in a no-drive or no load condition (i.e., zero torque applied by the drive unit) when transitioning between voltage levels. Embodiments described herein provide a solution to these limitations by allowing for voltage switching or adjustment of voltage applied to a single motor or drive unit without resulting in any torque holes. Embodiments thus improve propulsion systems, including single drive systems, by allowing for voltage change and operation at optimum voltage levels for different torque and speed conditions in a smooth manner.

The embodiments are not limited to use with any specific vehicle and may be applicable to various contexts. For example, embodiments may be used with automobiles, trucks, aircraft, construction equipment, farm equipment, automated factory equipment and/or any other device or system that includes multiple drives and/or multiple conversion devices.

FIG. 1 shows an embodiment of a motor vehicle 10, which includes a vehicle body 12 defining, at least in part, an occupant compartment 14. The vehicle body 12 also supports various vehicle subsystems including a propulsion system 16, and other subsystems to support functions of the propulsion system 16 and other vehicle components, such as a braking subsystem, a suspension system, a steering subsystem, and if the vehicle is a hybrid electric vehicle, a fuel injection subsystem, an exhaust subsystem and others.

The vehicle 10 may be an electrically powered vehicle (EV), a hybrid vehicle or any other vehicle that includes an electric motor. In an embodiment, the vehicle 10 includes a propulsion system 16 having a drive unit 20. The drive unit 20 includes an electric motor 22 that is configured to receive power from a battery system 40. The battery system 40 may also provide power to other components, such as a cooling system 24.

In an embodiment, the electric motor 22 is a dual winding motor having at least two sets of windings. A first set of windings includes a phase winding for each phase of the motor, and a second set of windings includes a phase winding for each phase. The drive unit 20 also includes an inverter connected to each set of windings. For example, as shown in FIG. 1, the drive unit 20 includes a first inverter 26 connected to one of the sets of windings, and a second inverter 28 connected to the other set of windings. Each inverter converts direct current (DC) power from the battery system 40 to poly-phase (e.g., two-phase, three-phase, six-phase, etc.) alternating current (AC) power to drive the motor 22.

As shown in FIG. 1, the vehicle 10 includes one motor. However, embodiments are not so limited. For example, the vehicle 10 may include at least one additional electric motor. An additional electric motor may be a dual winding motor, which would have its own set of inverters.

In the embodiment of FIG. 1, the motor 22 is a three-phase dual winding motor, but is not so limited. For example, the motor 22 may have more than two sets of windings, and have an inverter for each set. Thus, embodiments described herein are applicable to any multi-winding motor having any number of phases.

In the propulsion system 16, the drive unit 20 and the electric motor 22 are connected to the battery system 40. The battery system 40 may also be electrically connected to other components, such as vehicle electronics (e.g., via an auxiliary power module or APM 30). The battery system 40 may be configured as a rechargeable energy storage system (RESS).

In an embodiment, the battery system 40 includes a plurality of separate battery assemblies, in which each battery assembly can used in various configurations to provide different voltage levels. For example, the battery system 40 includes a first battery assembly such as a first battery pack 44 and a second battery pack 46. The battery pack 44 includes a plurality of battery modules 48, and the battery pack 46 includes a plurality of battery modules 50. Each module 48, 50 includes a number of individual cells (not shown). Although only two battery assemblies are shown, embodiments may include any number of battery assemblies (e.g., more than two battery packs).

A charging system can be used to charge the battery pack 44 and the battery pack 46, and/or to supply power from the battery pack 44 and/or the battery pack 46 to charge another energy storage system (e.g., vehicle-to-vehicle (V2V) and/or vehicle-to-everything (V2X) charging). The charging system includes an onboard charging module (OBCM) 52 that is electrically connected to a charge port 54 for charging from an energy storage system such as a utility AC power supply.

The battery system 40 and/or the propulsion system 16 includes various switching devices for controlling operation of the battery packs and selectively connecting the battery packs to the drive unit 20. The various switches may be used to adjust or change an output voltage used to drive the motor 22. For example, one or more switches are controlled to change the voltage during vehicle propulsion, in a manner that provides a smooth transition and reduces or minimizes any torque holes that can occur using existing control systems. The various switches and associated control devices and circuitry are referred to collectively as a "switching system". Transitioning between voltages is also referred to as "voltage switching."

In an embodiment, the switching system include at least one switching device 60 (also referred to as a "battery switching device") for selectively connecting the battery pack 44 to the battery pack 46 in series. The battery switching device 60 allows for connecting the battery packs 44 and 46 in parallel or in series to provide various levels of voltage.

In an embodiment, the switching system includes switching devices that permit selective connection and disconnection of sets of windings to facilitate voltage switching, and maintain a level of torque to propel the vehicle 10 during voltage switching, as discussed further herein. For example, a switching device 62 selectively connects the battery system 40 to the inverter 26 and a first set of windings, and a switching device 64 selectively connects the battery system to the inverter 28 and a second set of windings.

Any of various controllers can be used to control functions of the battery system 40, the switching system and the drive unit 20. A controller includes any suitable processing device or unit, and may use an existing controller such as a drive system controller, an RESS controller, and/or controllers in the drive system. For example, a controller 65 may be included for controlling switching and drive control operations as discussed herein.

The vehicle 10 also includes a computer system 55 that includes one or more processing devices 56 and a user interface 58. The computer system 55 may communicate with the charging system controller, for example, to provide commands thereto in response to a user input. The various processing devices, modules and units may communicate with one another via a communication device or system, such as a controller area network (CAN) or transmission control protocol (TCP) bus.

Figure 2:
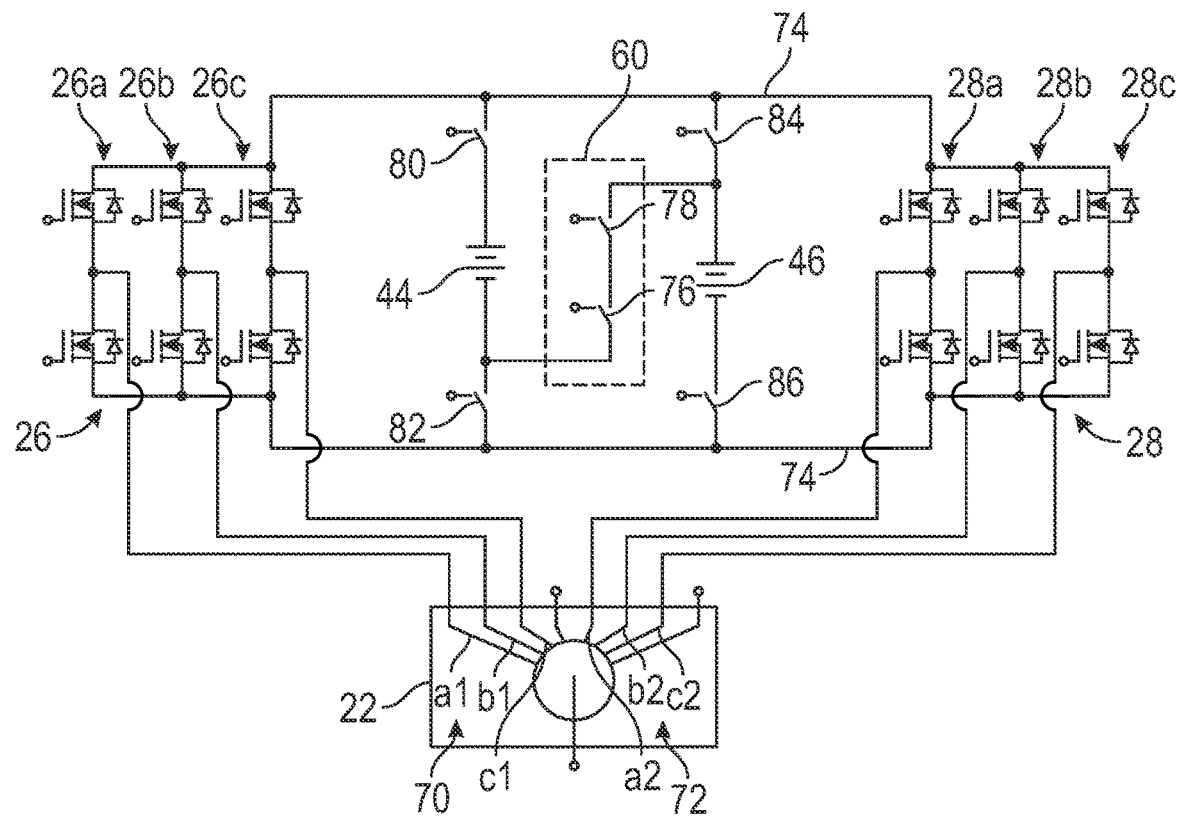
FIG. 2 depicts a battery system having two separate battery packs or two halves of a single pack, a propulsion system that includes a drive unit having a dual winding electric motor, and various switches for changing a voltage output of the battery system, in accordance with an exemplary embodiment.

FIG. 2 depicts an embodiment of the propulsion system 16 and the battery system 40, and schematically represents the circuitry connecting the battery system 40 to the motor 22. As shown, the motor 22 is a dual winding motor, which includes two sets of three-phase (or poly-phase) windings. For example, the motor 22 is a segmented-winding machine having at least two sets of windings. The motor 22 may be a permanent magnet synchronous motor, but is not so limited and can be any suitable type of motor (e.g., induction motor).

The sets of windings include a first set of windings 70 having a group of phase windings a1, b1, c1, and a second set of windings 72 having a group of phase windings a1, b1, c1. In this embodiment, windings a1 and a2 have the same phase (phase A), windings b1 and b2 have the same phase (phase B), and windings c1 and c2 have the same phase (phase C). The phases A, B and C are separated, in an embodiment, by 120 degrees.

The first set of windings 70 is connected in parallel to the second set of windings in the motor 22. Specifically, the phase winding a1 is connected in parallel to the phase winding a2, the phase winding b1 is connected in parallel to the phase winding b2, and the phase winding c1 is connected in parallel to the phase winding c2.

As shown, the first set of windings 70 is connected to the inverter 26, and the second set of windings 72 is connected to the inverter 28. During normal propulsion (i.e., when the battery system is supplying current to both sets of windings 70 and 72), the battery system 40 provides an output current that is transformed into AC current by the inverters 26 and 28. For each phase, one half of the total magnitude of the output current is provided by the inverter 26, and the other half is provided by the inverter 28.

Each inverter 26 and 28 has three phase branches (A, B and C) for connecting to respective phase terminals in the motor 22. The inverter 26 includes three sets of switches 26a, 26b and 26c in half-bridge configurations for converting DC power to AC power to drive the motor 22 by applying current to the first set of windings 70. The inverter 26 and the first set of windings 70 define a first propulsion channel, referred to as "motor channel 1." Likewise, the inverter 28 includes three sets of switches 28a, 28b and 28c in half-bridge configurations for converting DC power to AC power, and applying AC current to the second set of windings 72. The inverter 28 and the second set of windings 72 define a second propulsion channel, referred to as "motor channel 2."

As shown, the first inverter 26 and the second inverter 28 are connected to a propulsion DC bus 74. The battery switching device 60 includes at least one switch that can be operated to connect and disconnect the battery packs to each other. The battery switching device 60 may include two switches 76 (SE1) and 78 (SE2) as shown, or may include a single switch. The battery pack 44 is connected to the propulsion bus 74 by switches 80 (SA1) and 82 (SA2), and the battery pack 46 is connected to the propulsion bus 74 by switches 84 (SB1) and 86 (SB2).

The switches may be operated in various configurations to control which battery pack(s) supplies which inverter(s), and to vary the voltage applied to the inverter(s). In an embodiment, the battery packs 44 and 46 both have the same nominal voltage (e.g., 400 V), and one or more switches can be controlled to connect the battery packs 44 and 46 in parallel to supply a low voltage (voltage is the same as the battery pack voltages, and total current is sum of currents through the battery packs 44 and 46). One or more switches can be controlled to connect the battery packs in series to supply a high voltage (voltage is the sum of individual voltages of the battery packs 44 and 46). For example, each battery pack 44 and 46 has a voltage of 400 V, and can be configured to output a low voltage (400 V in this example) by connecting the battery packs 44 and 46 in parallel, and configured to output a high voltage (800 V in this example) by connecting the battery packs 44 and 46 in series. The terms "low voltage" and "high voltage" are relative terms and are not intended to be limiting as to any particular voltage level.

It is noted that there may be more than two battery packs, with at least one switch between adjacent battery packs; in this case, the battery packs can be connected to each other in various ways to provide more than two voltages. In addition, there may be a single battery pack having multiple parts (e.g., a single battery with switches separating parallel strings of cell); in this case, the switching system can be used to apply different voltages by connecting the strings in various ways.

Figure 3:
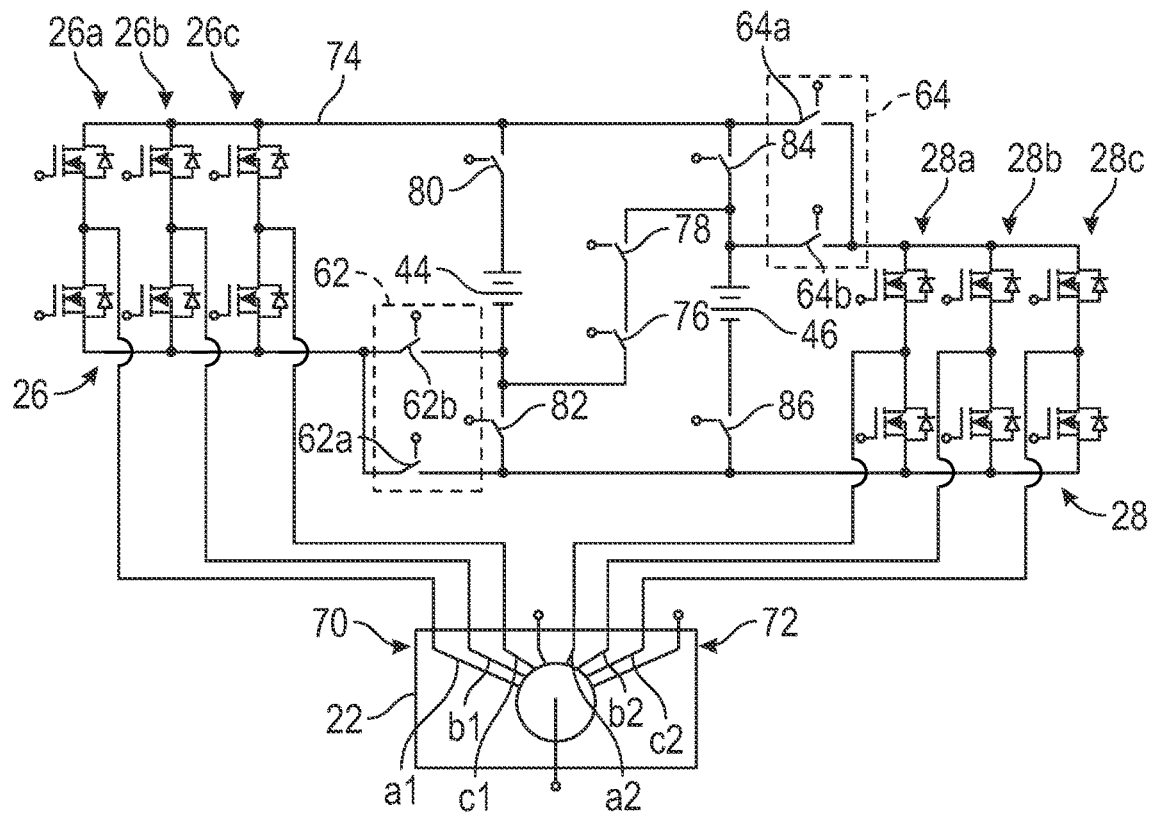
FIG. 3 depicts components of a vehicle including a battery system having two separate battery packs or two halves of a single pack, a propulsion system that includes a drive unit having a dual winding electric motor, and a switching system for facilitating transitions between voltages applied to the electric motor for propelling the vehicle, in accordance with an exemplary embodiment.

FIG. 3 depicts an embodiment of the propulsion system 16, the battery system 40 and switching system, including the switching device 60. This embodiment also includes an exemplary configuration of the switching devices 62 and 64.

The switching device 62 ("first switching device") and the switching device 64 ("second switching device") may be single pole double throw switches (or other types of switches) and are operable to selectively connect the inverters and drive units to the propulsion bus 74. The switching devices 62 and 64 provide flexibility in applying voltage levels to the motor 22, and allow the motor 22 to be operated at different bus voltage levels. The switching devices 62 and 64 can be operated during drive conditions, and controlled to change voltage levels without any interruption, thereby avoiding torque holes (zero torque during switching) and ensuring smooth transitions and drivability.

In an embodiment, the switching device 62 is configured as a three-way switching device that connects the first inverter 26 to two switches or switch legs. The switching device 62 is shown schematically as being connected to the inverter 26 via a node C1. The switching device 62 includes a first switch 62a (or first switch leg) that selectively connects the node C1 to a node A1 on the DC bus 74. A second switch 62b (or second switch leg) selectively connects the node C1 to a node B1 and is parallel to the switch 62a. Because the switch 62a and the switch 62b are both connected to the node C1 at one side, but are connected to different points in the circuit across the switch 82 (SA2), the switching device 62 can be considered a single device known as a single pole double throw (SPDT) switch.

In an embodiment, the switching device 64 is also configured as a three-way switching device that connects the second inverter to two switches or switch legs. The switching device 64 is shown schematically as being connected to the inverter 28 via a node C2. The switching device 64 includes a third switch 64a that selectively connects the node C2 to a node A2, and a fourth switch 64b that selectively connected the node C2 to a node B2. The switching device 64 can also be considered a SPDT switch (the switches 64a and 64b are both connected to the node C2, but are connected to different points across the switch 84).

In an embodiment, the switching devices 62 and 64 include mechanical contactors. The switching devices 62 and 64 are configured as single pole double throw (SPDT) switches for illustration purposes, but can be any other suitable type of mechanical switch. Each switching device 62 and 64 may be integrated into the battery system circuit, or included as a single device or removable module.

FIGS. 4-8 depict various switching states of the switching system and corresponding operating modes of the propulsion system 16. Control of the switching devices 60, 62 and 64 and switching states are discussed in conjunction with the embodiment of FIG. 2 (mechanical contactors). However, the switching states can be similarly controlled using solid state switches (see FIG. 9).

To transition between the switching states (and corresponding operating modes), the controller 65 (or other suitable processor or processing device), performs a sequential switching operation in which one set of windings drives the motor while a voltage switch is performed for the other set of windings.

Figure 4:
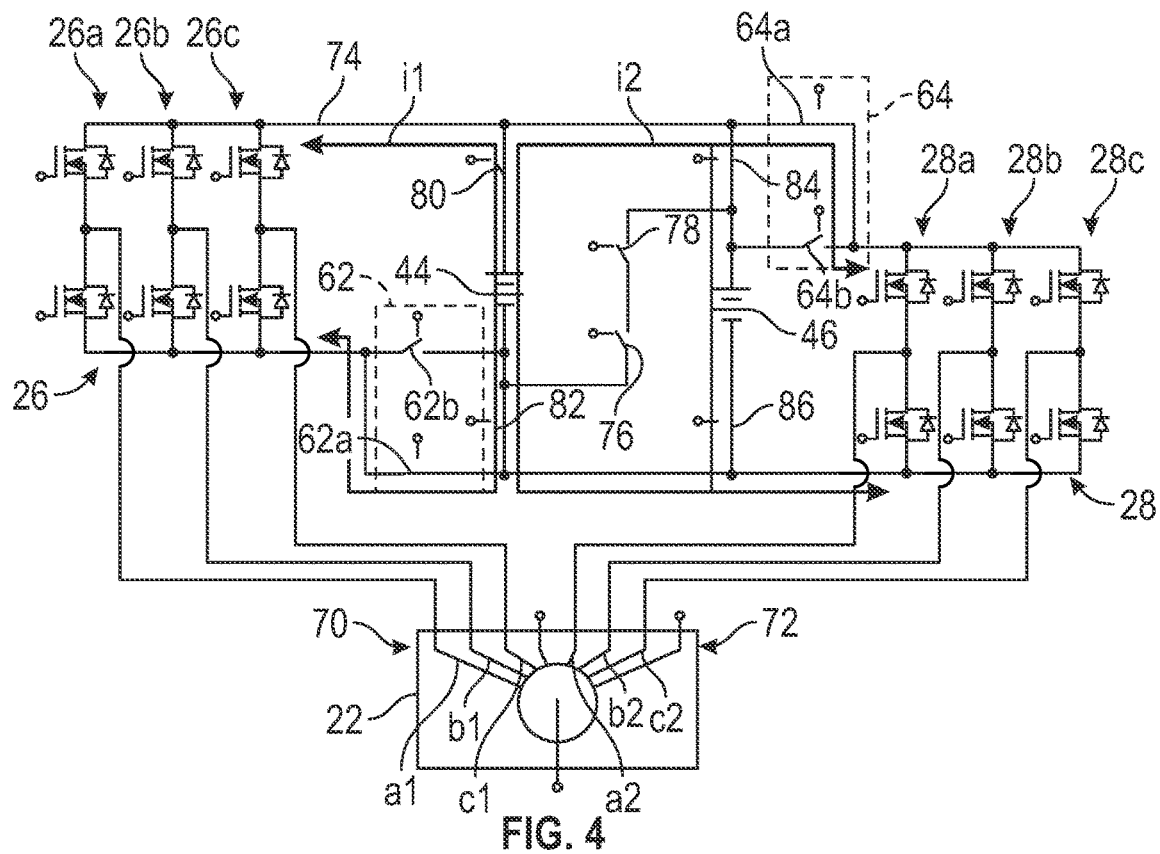
FIG. 4 depicts the propulsion system of FIG. 3 in a low voltage operating state, in accordance with an exemplary embodiment.
Figure 5:
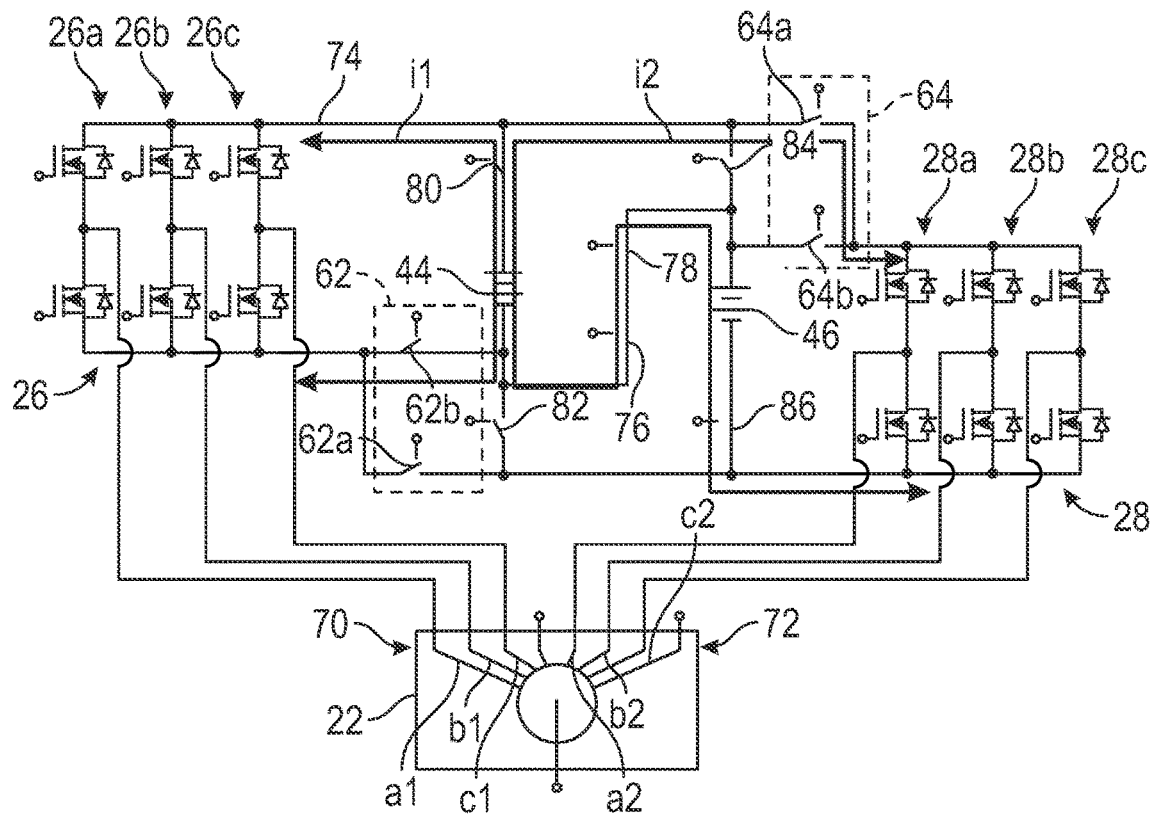
FIG. 5 depicts the propulsion system of FIG. 3 in an intermediate operating state in which a first set of windings of the electric motor is powered at a high voltage and a second set of windings of the electric motor is powered at a low voltage, in accordance with an exemplary embodiment.
Figure 6:
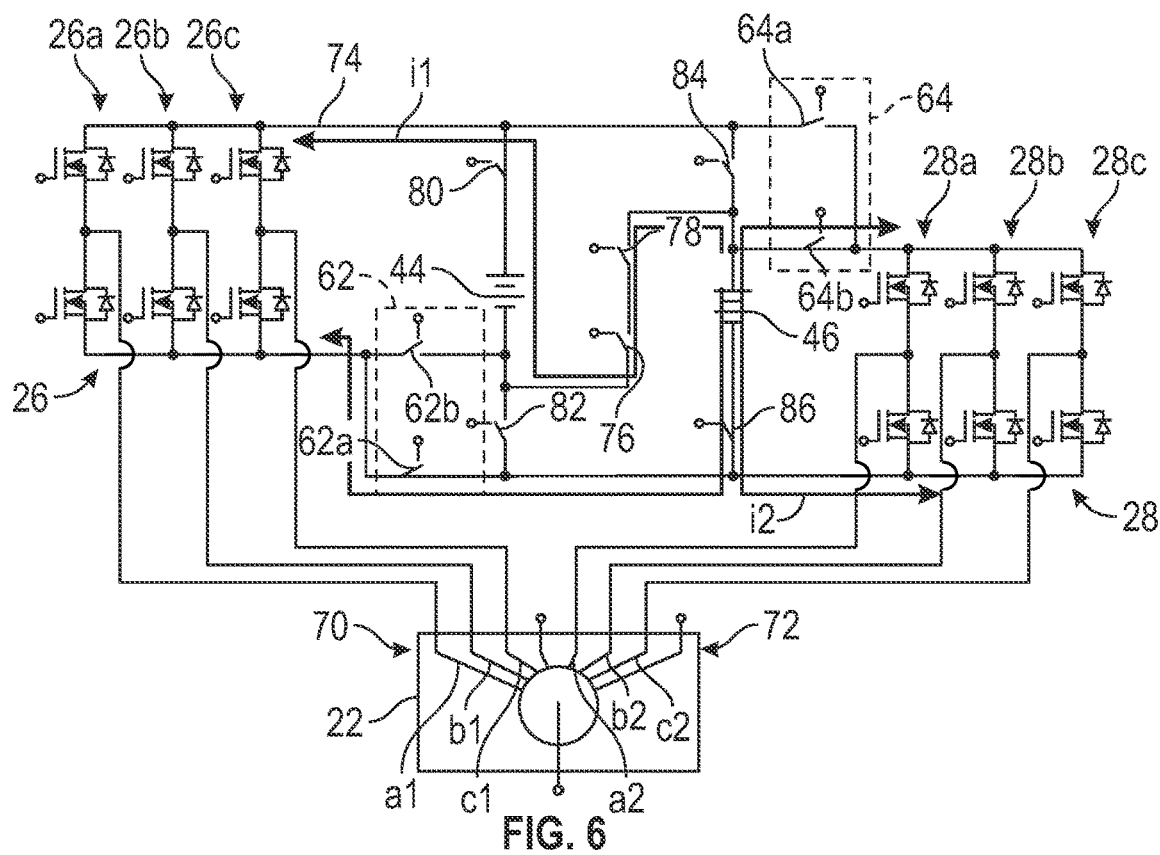
FIG. 6 depicts the propulsion system of FIG. 3 in an intermediate operating state in which the first set of windings of the electric motor is powered at a low voltage and the second set of windings of the electric motor is powered at a high voltage, in accordance with an exemplary embodiment.
Figure 7:
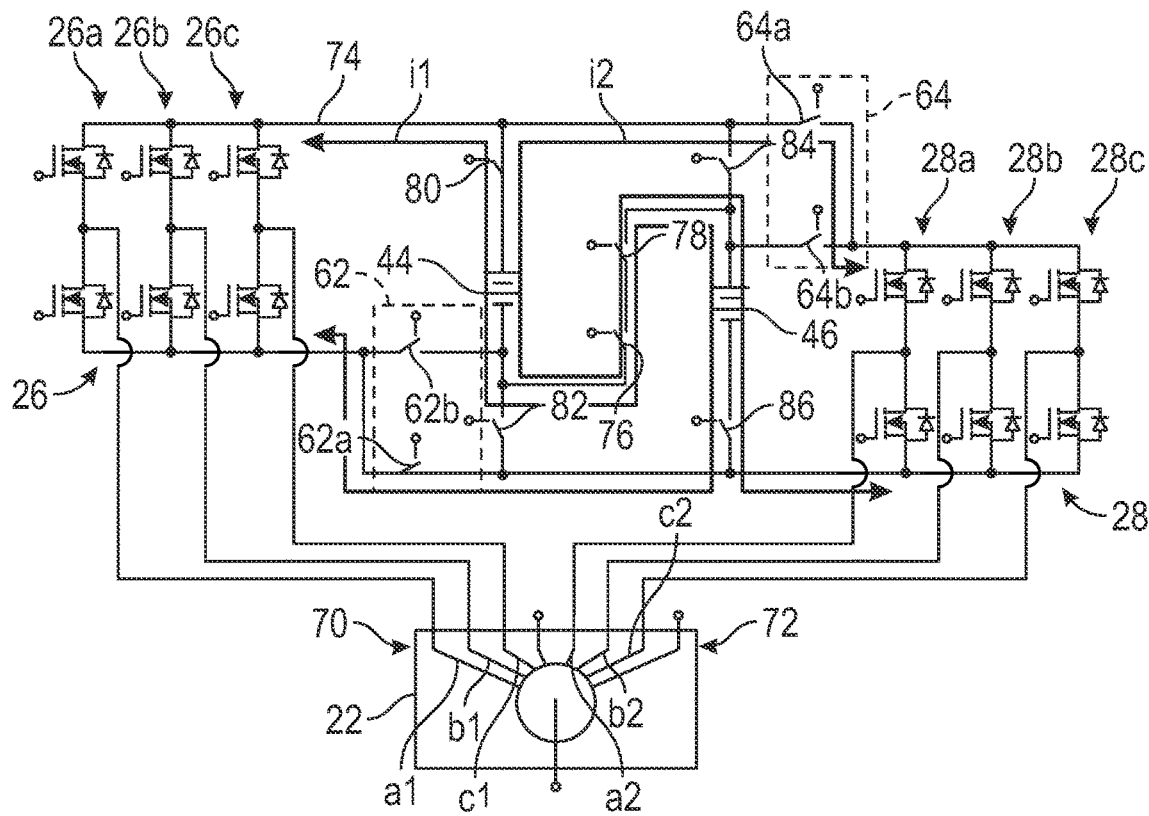
FIG. 7 depicts the propulsion system of FIG. 3 in a high voltage operating state, in accordance with an exemplary embodiment.

For example, FIG. 4 shows an initial state in which the vehicle 10 is operating at an initial voltage level, FIGS. 5 and 6 show intermediate states, and FIG. 7 shows a target state at which the vehicle 10 is operating at a target voltage. In this example, switching is sequentially controlled to transition from the initial state of FIG. 4 to an intermediate state in which one set of windings drives the motor while voltage switching occurs for the other set of windings (the intermediate state may be the state of FIG. 5 or FIG. 6). Subsequently, switching is sequentially controlled to voltage switch the other set of windings (while the one set of windings drives the motor) and put the vehicle 10 into a target state shown in FIG. 7. Alternatively, the initial state may be the state of FIG. 7, and the sequential switching operations are performed to transition to a target state of FIG. 4. In another alternative, the target state may be the state of FIG. 5 or FIG. 6. In this way, propulsion voltage can be changed while maintaining a level of torque and avoiding torque holes.

FIG. 4 shows the switching system when the vehicle 10 is in a "low voltage" operating state. In this state, the switches 76 (SE1) and 78 (SE2) are open (turned OFF), and the battery packs 44 and 46 are connected in parallel to the DC bus 74. Switches 80 (SA1), 82 (SA2) are closed (turned ON), and switches 84 (SB1) and 86 (SB2) are closed. The battery pack 44 supplies power to the inverter 26 and the first set of windings 70 via a current i1 using the battery voltage (low voltage, such as 400 V), and the battery pack 46 supplies power to the inverter 28 and the second set of windings 72 via a current i2 at the low voltage.

The switch 62b is open (OFF) and the switch 62a is closed (ON) and connects the node C1 to the node A1. Switch 64a is closed and switch 64b is open to connect the node C2 to the node A2. In this way, the inverters and both battery packs are connected in parallel to the DC bus 74.

FIG. 5 shows the switching system when the vehicle 10 is in an intermediate operating state, in which the inverter 26 is supplied with power at the low voltage, and the inverter 28 is supplied with power at the high voltage. The switches 76 (SE1) and 78 (SE2) are closed to connect the battery packs 44 and 46 in series.

In this state, the switching device 62 connects the node C1 only to the battery pack 44 by closing the switch 62b and opening the switch 62a. Switch 80 (SA1) is closed and switch 82 (SA2) is open. Switch 84 (SB1) is open and switch 86 (SB2) is closed. Switch 64a is closed and switch 64b is open to connect the nodes C2 and A2. To convert from the low voltage state to this state, the switch 62 is operated first to maintain the first set of windings 70 at the low voltage. The switch 64 is then operated to switch the voltage applied to the second set of windings 72 while the first set of windings 70 is powered at the low voltage. This sequential operation may be performed to transition between any of the various states described herein (i.e., by controlling the switch 62 first and subsequently controlling the switch 42, or vice versa).

When the vehicle 10 is converted from the low voltage state to this intermediate state, the battery pack 46 and the battery pack 44 are connected in series to the inverter 28, and the second set of windings 72 is powered by current i2 at the high voltage. The battery pack 44 supplies power to the inverter 26 at the low voltage via the current i1. Thus, the first set of windings 70 accepts the low voltage and assumes the full commanded torque.

FIG. 6 shows the switching system when the vehicle 10 is in another intermediate operating state, in which the inverter 26 is supplied with power at the high voltage, and the inverter 28 is supplied with power at the low voltage. The switches 76 (SE1) and 78 (SE2) are closed to connect the battery packs 44 and 46 in series.

The switching device 62 connects the series-connected battery packs to the inverter 26 (the switch 62b is open and the switch 62a is closed). Switch 80 (SA1) is closed and switch 82 (SA2) is open. Switch 84 (SB1) is open and switch 86 (SB2) is closed. The switching device 64 connects the battery pack 46 to the inverter 28 (Switch 64a is open and switch 64b is closed to connect nodes A2 and C2). In this state, the second set of windings 72 assumes the full commanded torque while the first set of windings 70 transitions to the high voltage.

FIG. 7 shows the switching system when the vehicle 10 is in a "high voltage" operating mode. In this mode, the switches 70 (SE1) and 72 (SE2) are closed to connect the battery packs 44 and 46 in series. The battery packs 44 and 46 both supply power to the inverter 26 and the inverter 28 at a high voltage (the sum of the battery voltages, such as 800 V).

The switching device 62 connects the node C1 to the battery packs 44 and 46 by opening the switch 62 band closing the switch 62*a*. Switch 80 (SA1) is closed and switch 82 (SA2) is open. Switch 84 (SB1) is open and switch 86 (SB2) is closed. Switch 64*a* is closed and switch 64*b* is open to connect the inverter 28 to the battery packs 44 and 46 via the node C2. During operation, current i1 is supplied to the inverter 26 at the high voltage, and current i2 is supplied to the inverter 28 at the high voltage.

It is noted that, when transitioning to a low voltage state from an initial high voltage state, the motor windings that provide propulsion during the transition may not provide the full torque. For example, if the initial state is the high voltage state of FIG. 7, when one of the sets of windings is switched to the low voltage state, the other set of windings provides propulsion at the low voltage (i.e., half of the initial torque). Even in this situation, a torque hole does not occur, as torque is continually applied during the transition.

Figure 8:
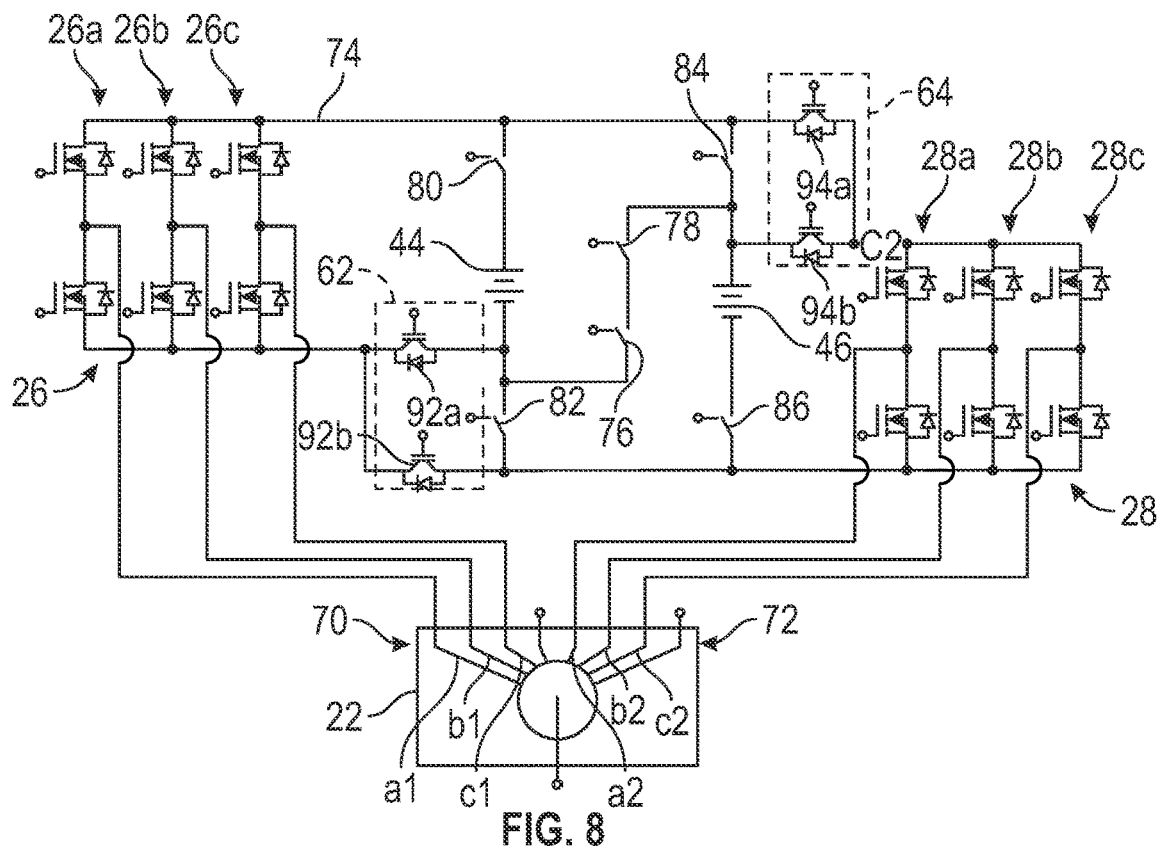
FIG. 8 depicts components of a vehicle including a battery system having two separate battery packs or two halves of a single pack, a propulsion system that includes a drive unit having a dual winding electric motor, and a switching system for facilitating transitions between voltages applied to the electric motor for propelling the vehicle, in accordance with an exemplary embodiment.

FIG. 8 depicts an embodiment in which the switching devices 62 and 64 are configured as solid state switching devices. Any suitable solid state or electronic device may be employed as a switch. For example, the switching devices 62 and 64 can include solid state relays and transistors such as Silicon (Si) insulated gate bipolar transistors (IGBTs), and field-effect transistors (FETs). Examples of FETs include metal-oxide-semiconductor FETs (MOSFETs), Si MOSFETs, silicon carbide (Sic) MOSFETs, gallium nitride (GaN) high electron mobility transistors (HEMTs), and SiC junction-gate FETs (JFETs). Other examples of switches that can be used include diamond, gallium oxide and other wide band gap (WBG) semiconductor-based power switch devices.

For example, the switching device 62 includes two solid state switches such as IGBTs 92*a* and 92*b*, which are connected to the node C1 as a half-bridge. The switching device 64 includes IGBTs 94*a* and 94*b* (or two other solid state switches) connected to the node C2 as a half-bridge.

Figure 9:
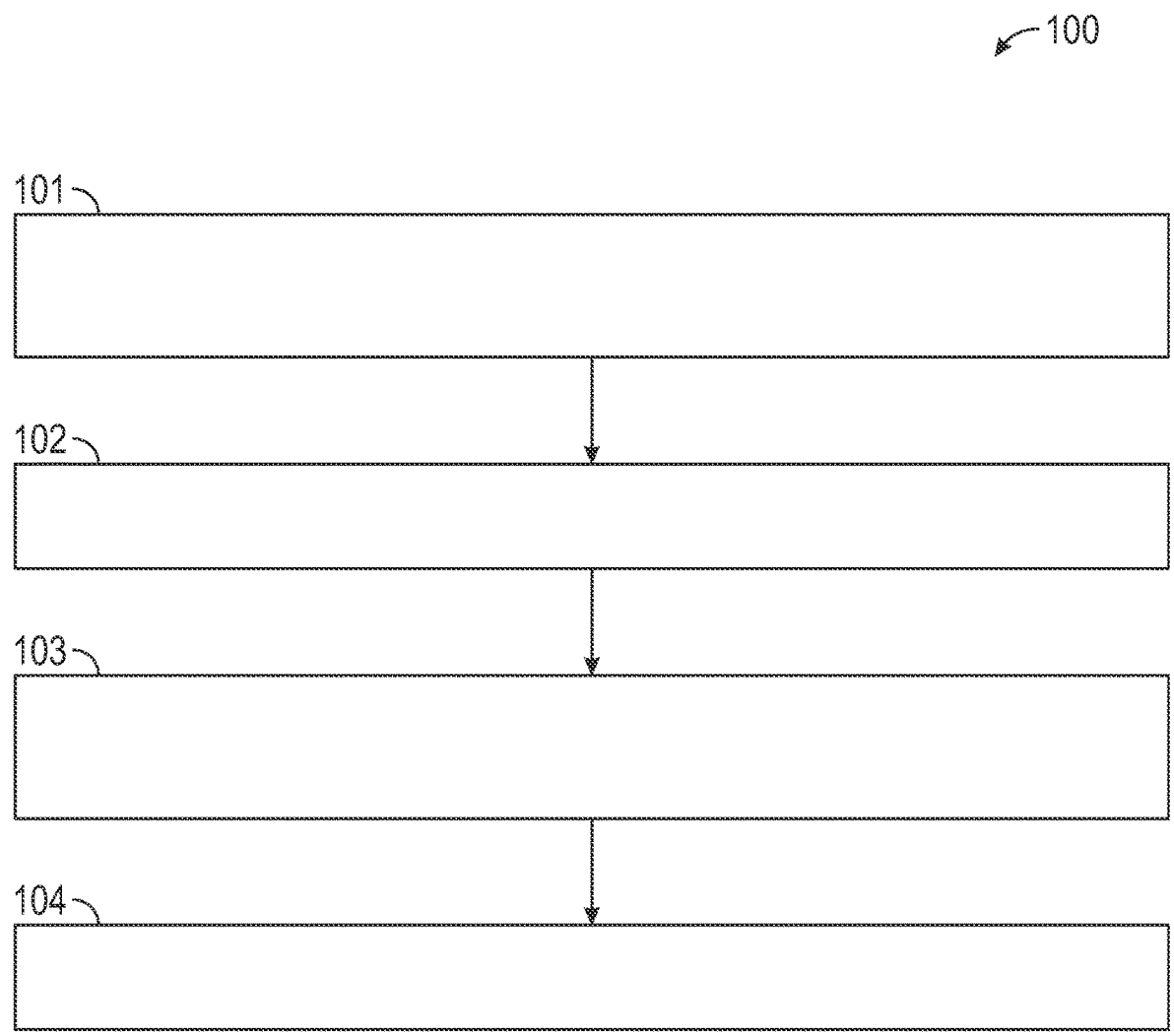
FIG. 9 is a flow diagram depicting aspects of a method of controlling a propulsion system of a vehicle, in accordance with an exemplary embodiment.

FIG. 9 illustrates embodiments of a method 100 of controlling a propulsion system of a vehicle, such as the propulsion system 16. Aspects of the method 100 may be performed by a processor or processors disposed in a vehicle, such as the controller 65. However, the method 100 is not so limited, as the method may be performed by any suitable processing device or system, or combination of processing devices.

The method 100 includes a number of steps or stages represented by blocks 101-104. The method 100 is not limited to the number or order of steps therein, as some steps represented by blocks 101-104 may be performed in a different order than that described below, or fewer than all of the steps may be performed.

At block 101, during a driving or propulsion condition (i.e., a condition in which voltage is being applied to the motor 22 according to a commanded torque), the controller 65 determines if it is desired to change a voltage level applied to the motor from an initial voltage to a target voltage. This determination may be based on a request to change an operating mode of the vehicle 10 (e.g., via user interaction with the vehicle 10, such as a request to put the vehicle into a high performance mode). In addition, or alternatively, the determination may be based on measurements of vehicle and/or driver condition, such as vehicle speed, driver interaction with a gas pedal and others.

For example, the vehicle 10 is in a normal mode in which the initial voltage is a low voltage (e.g., 400 V). The switching devices 60 and 62 of the switching system are set to switching positions such that both sets of windings receive the low voltage (e.g., 400 V). These switching positions correspond to a low voltage state of the switching system. The user may request transition into a high performance mode, where high voltage (e.g., 800 V) is to be applied to the motor 22. The user may request transition into other modes, such as a mode in which high voltage is applied to one drive unit and low voltage is applied to the other drive unit.

At block 102, the switching system is controlled so that a first set of windings receives the initial voltage. For example, the switching device 62 is controlled to connect only the battery pack 44 to the inverter 26 by opening the switch 62*a* and closing the switch 62*b*. This switching position of the switching device 62 is shown in FIG. 5, and causes the first set of windings 70 to be powered at the initial voltage.

At block 103, the switching system is subsequently controlled to switch a voltage applied to a second set of windings from the initial voltage to the target voltage. Switching of the voltage applied to the second set of windings occurs while the vehicle is being propelled due to torque generated by the first set of windings.

For example, while the battery pack 44 is providing current to the first set of windings 70, the switching device 64 is controlled to connect the battery packs 44 and 46 in series, and connect the series-connected battery packs to the set of windings 72. During this switching operation, the vehicle continues to be propelled by torque generated by the first set of windings to avoid interruptions.

At block 104, vehicle propulsion is controlled at the target voltage.

The method 100 may further include controlling the switching device 62 to switch the voltage applied to the first set of windings to the target voltage. This control is performed while the second set of windings is powered at the target voltage. In this way, both sets of windings are voltage switched without any torque holes.

Figure 10:
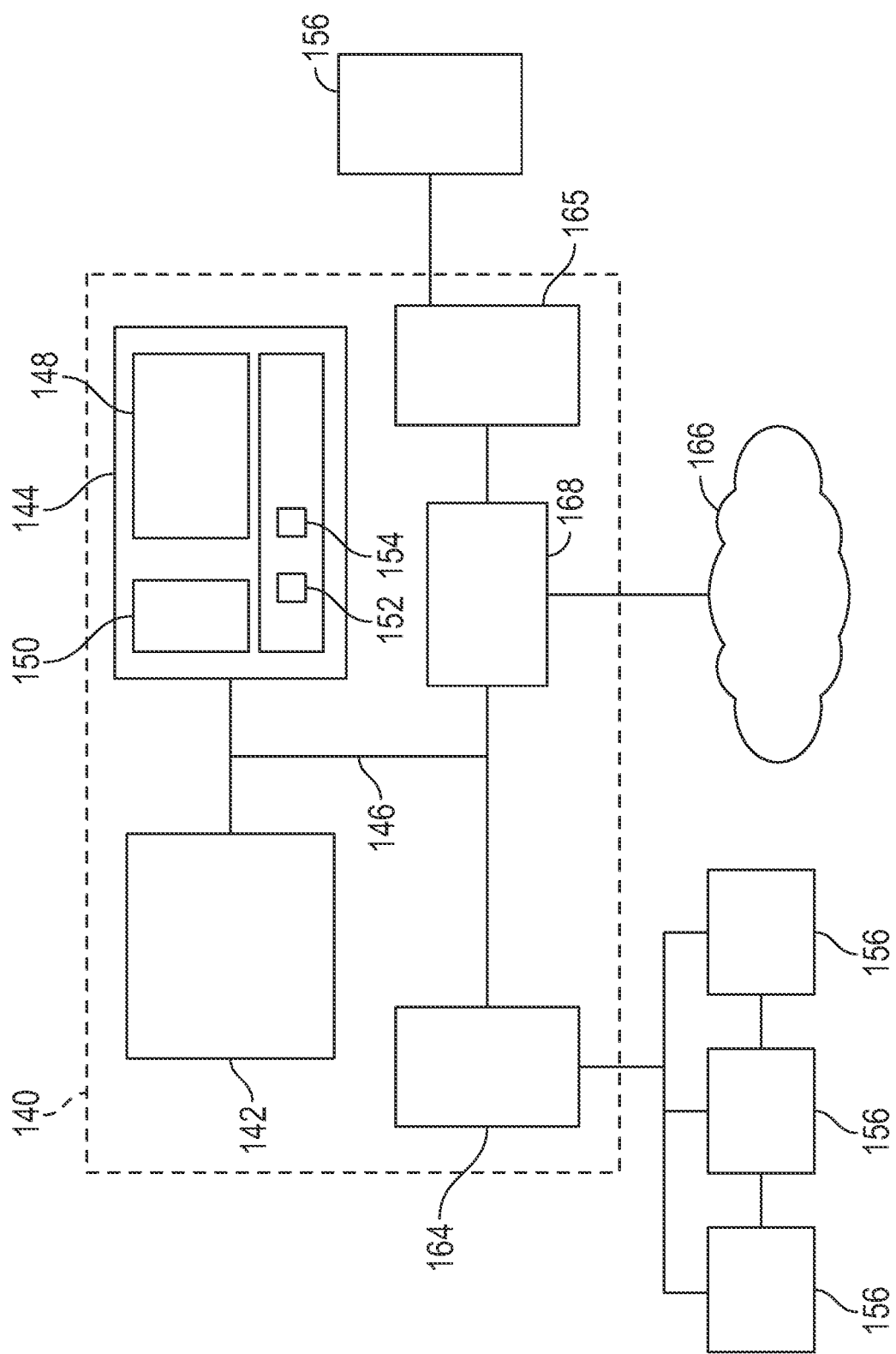
FIG. 10 depicts a computer system in accordance with an exemplary embodiment.

FIG. 10 illustrates aspects of an embodiment of a computer system 140 that can perform various aspects of embodiments described herein. The computer system 140 includes at least one processing device 142, which generally includes one or more processors for performing aspects of image acquisition and analysis methods described herein.

Components of the computer system 140 include the processing device 142 (such as one or more processors or processing units), a memory 144, and a bus 146 that couples various system components including the system memory 144 to the processing device 142. The system memory 144 can be a non-transitory computer-readable medium, and may include a variety of computer system readable media. Such media can be any available media that is accessible by the processing device 142, and includes both volatile and non-volatile media, and removable and non-removable media.

For example, the system memory 144 includes a non-volatile memory 148 such as a hard drive, and may also include a volatile memory 150, such as random access memory (RAM) and/or cache memory. The computer system 140 can further include other removable/non-removable, volatile/non-volatile computer system storage media.

The system memory 144 can include at least one program product having a set (e.g., at least one) of program modules that are configured to carry out functions of the embodiments described herein. For example, the system memory 144 stores various program modules that generally carry out the functions and/or methodologies of embodiments described herein. A module 152 may be included for performing functions related to monitoring a propulsion system, and a module 154 may be included to perform functions related to switching. The system 140 is not so limited, as other modules may be included. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The processing device 142 can also communicate with one or more external devices 156 as a keyboard, a pointing device, and/or any devices (e.g., network card, modem, etc.) that enable the processing device 142 to communicate with one or more other computing devices. Communication with various devices can occur via Input/Output (I/O) interfaces 164 and 165.

The processing device 142 may also communicate with one or more networks 166 such as a local area network (LAN), a general wide area network (WAN), a bus network and/or a public network (e.g., the Internet) via a network adapter 168. It should be understood that although not shown, other hardware and/or software components may be used in conjunction with the computer system 40. Examples include, but are not limited to: microcode, device drivers, redundant processing units, external disk drive arrays, RAID systems, and data archival storage systems, etc.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this invention belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A system for controlling a propulsion system of a vehicle, comprising:
    a switching system connected to a battery system and the propulsion system, the battery system including a first battery assembly and a second battery assembly, the propulsion system including an electric motor having a first set of windings and a second set of windings, the switching system including a first switching device connecting the battery system to the first set of windings and a second switching device connecting the battery system to the second set of windings; and
    a controller configured to perform, during propulsion of the vehicle according to a commanded torque, transitioning the propulsion system from an initial propulsion mode in which an initial voltage is applied to the electric motor, to a target mode in which a target voltage is applied to the electric motor, the transitioning including:
        controlling the first switching device to provide current to the first set of windings at the initial voltage and operate the electric motor to produce torque used to propel vehicle; and
        subsequently controlling the second switching device to cause the battery system to apply the target voltage to the second set of windings, wherein the second switching device is controlled while a current is provided to the first set of windings at the initial voltage.

2. The system of claim 1, wherein the transitioning further includes controlling the first switching device to cause the battery system to apply the target voltage to the first set of windings while the battery system is applying the target voltage to the second set of windings.

3. The system of claim 1, wherein the first switching device and the second switching device include mechanical switches or solid state switches.

4. The system of claim 1, wherein the first battery assembly is connected to a first inverter configured to supply alternating current (AC) to the first set of windings, and the second battery assembly is connected to a second inverter configured to supply AC current to the second set of windings.

5. The system of claim 4, wherein the first battery assembly is selectively connected to a propulsion bus by a first switch, and the first switching device has a first switching position that connects the first inverter to a node between the first switch and the propulsion bus, and a second switching position that connects the first inverter to a node between the first switch and the first battery assembly; and
    the second battery assembly is selectively connected to the propulsion bus by a second switch, and the second switching device has a first switching position that connects the second inverter to a node between the second switch and the propulsion bus, and a second switching position that connects the second inverter to a node between the second switch and the second battery assembly.

6. The system of claim 5, wherein the first switching device and the second switching device are single pole double throw switches.

7. The system of claim 1, wherein one of the initial voltage and the target voltage is a low voltage, the low voltage achieved by connecting the first battery assembly to a propulsion bus in parallel with the second battery assembly.

8. The system of claim 7, wherein one of the initial voltage and the target voltage is a high voltage, the high voltage achieved by connecting the first battery assembly in series with the second battery assembly.

9. A method of controlling a propulsion system of a vehicle, comprising:
receiving a request to transition the propulsion system from an initial voltage to a target voltage, the propulsion system including an electric motor having a first set of windings and a second set of windings, the electric motor connected to a battery system including a first battery assembly and a second battery assembly, the propulsion system including a switching system having a first switching device connecting the battery system to the first set of windings and a second switching device connecting the battery system to the second set of windings; and
during propulsion of the vehicle according to a commanded torque, transitioning the propulsion system from an initial propulsion mode in which the initial voltage is applied to the electric motor, to a target mode in which the target voltage is applied to the electric motor, the transitioning including:
controlling the first switching device to provide current to the first set of windings at the initial voltage and operate the electric motor to produce torque used to propel vehicle; and
subsequently controlling the second switching device to cause the battery system to apply the target voltage to the second set of windings, wherein the second switching device is controlled while a current is provided to the first set of windings at the initial voltage.

10. The method of claim 9, wherein the transitioning further includes controlling the first switching device to cause the battery system to apply the target voltage to the first set of windings while the battery system is applying the target voltage to the second set of windings.

11. The method of claim 9, wherein the first switching device and the second switching device include mechanical switches or solid state switches.

12. The method of claim 9, wherein the first battery assembly is connected to a first inverter configured to supply AC current to the first set of windings, and the second battery assembly is connected to a second inverter configured to supply AC current to the second set of windings.

13. The method of claim 12, wherein the first battery assembly is selectively connected to a propulsion bus by a first switch, and the first switching device has a first switching position that connects the first inverter to a node between the first switch and the propulsion bus, and a second switching position that connects the first inverter to a node between the first switch and the first battery assembly; and
the second battery assembly is selectively connected to the propulsion bus by a second switch, and the second switching device has a first switching position that connects the second inverter to a node between the second switch and the propulsion bus, and a second switching position that connects the second inverter to a node between the second switch and the second battery assembly.

14. The method of claim 13, wherein the first switching device and the second switching device are single pole double throw switches.

15. The method of claim 9, wherein one of the initial voltage and the target voltage is a low voltage, the low voltage achieved by connecting the first battery assembly to a propulsion bus in parallel with the second battery assembly.

16. The method of claim 15, wherein one of the initial voltage and the target voltage is a high voltage, the high voltage achieved by connecting the first battery assembly in series with the second battery assembly.

17. A vehicle system comprising:
a memory having computer readable instructions; and
a processing device for executing the computer readable instructions, the computer readable instructions controlling the processing device to perform a method including:
receiving a request to transition a propulsion system from an initial voltage to a target voltage, the propulsion system including an electric motor having a first set of windings and a second set of windings, the electric motor connected to a battery system including a first battery assembly and a second battery assembly, the propulsion system including a switching system having a first switching device connecting the battery system to the first set of windings and a second switching device connecting the battery system to the second set of windings; and
during propulsion of a vehicle according to a commanded torque, transitioning the propulsion system from an initial propulsion mode in which the initial voltage is applied to the electric motor, to a target mode in which the target voltage is applied to the electric motor, the transitioning including:
controlling the first switching device to provide current to the first set of windings at the initial voltage and operate the electric motor to produce torque used to propel vehicle; and
subsequently controlling the second switching device to cause the battery system to apply the target voltage to the second set of windings, wherein the second switching device is controlled while a current is provided to the first set of windings at the initial voltage.

18. The vehicle system of claim 17, wherein the transitioning further includes controlling the first switching device to cause the battery system to apply the target voltage to the first set of windings while the battery system is applying the target voltage to the second set of windings.

19. The vehicle system of claim 17, wherein one of the initial voltage and the target voltage is a low voltage, the low voltage achieved by connecting the first battery assembly to a propulsion bus in parallel with the second battery assembly.

20. The vehicle system of claim 19, wherein one of the initial voltage and the target voltage is a high voltage, the high voltage achieved by connecting the first battery assembly in series with the second battery assembly.

* * * * *